United States Patent
Hashimoto

(10) Patent No.: US 10,425,484 B2
(45) Date of Patent: Sep. 24, 2019

(54) JUST A BUNCH OF FLASH (JBOF) APPLIANCE WITH PHYSICAL ACCESS APPLICATION PROGRAM INTERFACE (API)

(71) Applicant: TOSHIBA MEMORY CORPORATION, Tokyo (JP)

(72) Inventor: Daisuke Hashimoto, Cupertino, CA (US)

(73) Assignee: TOSHIBA MEMORY CORPORATION, Tokyo (JP)

( * ) Notice: Subject to any disclaimer, the term of this patent is extended or adjusted under 35 U.S.C. 154(b) by 304 days.

(21) Appl. No.: 15/253,631

(22) Filed: Aug. 31, 2016

(65) Prior Publication Data

US 2017/0180477 A1    Jun. 22, 2017

Related U.S. Application Data

(60) Provisional application No. 62/268,377, filed on Dec. 16, 2015.

(51) Int. Cl.
*H04L 29/08*   (2006.01)
*G06F 12/02*   (2006.01)

(52) U.S. Cl.
CPC ...... *H04L 67/1097* (2013.01); *G06F 12/0246* (2013.01); *G06F 2212/1041* (2013.01);
(Continued)

(58) Field of Classification Search
CPC . H04L 67/1097; G06F 3/0604; G06F 3/0665; G06F 3/0688; G06F 12/06;
(Continued)

(56) References Cited

U.S. PATENT DOCUMENTS 8,539,315 B2   9/2013   Hashimoto
8,984,375 B2   3/2015   Hashimoto
(Continued)

FOREIGN PATENT DOCUMENTS

WO    2014039845 A1   3/2014
WO    2014039922 A2   3/2014

OTHER PUBLICATIONS

U.S. Appl. No. 62/153,655, filed Apr. 28, 2015.
U.S. Appl. No. 62/138,315, filed Mar. 25, 2015.
U.S. Appl. No. 62/142,937, filed Apr. 3, 2015.

*Primary Examiner* — Tauqir Hussain
(74) *Attorney, Agent, or Firm* — Kim & Stewart LLP

(57) ABSTRACT

A storage array includes a first controller, memory, and one or more storage devices. Each of the storage devices comprises a second controller and a nonvolatile memory. The first controller receives a command and data from a host connected to the storage array and transmits a response or data to the host. When a write command, write data, and size information of the write data are received from the host, the first controller sends the received data to the second controller. The second controller determines a write address indicating a memory region of the nonvolatile memory in which the write data are to be written, based on the write command and the size information, writes the write data in the memory region associated with the write address, and transmits the write address to the first controller. The first controller further transfers the write address to the host.

18 Claims, 19 Drawing Sheets

(52) U.S. Cl.
CPC .. *G06F 2212/154* (2013.01); *G06F 2212/214* (2013.01); *G06F 2212/261* (2013.01); *G06F 2212/7201* (2013.01); *G06F 2212/7208* (2013.01)

(58) Field of Classification Search
CPC ......... G06F 2212/152; G06F 2212/154; G06F 2212/163; G06F 2212/214; G06F 2212/261; G06F 2212/263; G06F 2212/264; G06F 2212/7208
USPC ....................................................... 709/219
See application file for complete search history.

(56) References Cited

U.S. PATENT DOCUMENTS

| | | | | |
|---|---|---|---|---|
| 2012/0311237 | A1* | 12/2012 | Park | G06F 12/0246 711/103 |
| 2013/0073795 | A1* | 3/2013 | Hasegawa | G06F 13/16 711/103 |
| 2013/0159814 | A1* | 6/2013 | Hashimoto | G11C 29/04 714/773 |
| 2015/0074371 | A1 | 3/2015 | Hashimoto et al. | |
| 2016/0034354 | A1 | 2/2016 | Hashimoto et al. | |
| 2016/0048712 | A1* | 2/2016 | Butler | H04L 67/1097 340/10.51 |

* cited by examiner

FIG. 11

Block mapping table 46

Free block table 461

| Block address | Erase count |
|---|---|
| ... | ... |
| ... | ... |
| ... | ... |
| ... | ... |
| ... | ... |

Active block table 462

| Block address | Erase count |
|---|---|
| ... | ... |
| ... | ... |
| ... | ... |
| ... | ... |
| ... | ... |

Bad block table 463

| Block address | Erase count |
|---|---|
| ... | ... |
| ... | ... |
| ... | ... |
| ... | ... |

Input block table 464

| Block address | Page address to be written | Erase count |
|---|---|---|
| ... | ... | ... |
| ... | ... | ... |
| ... | ... | ... |
| ... | ... | ... |

JUST A BUNCH OF FLASH (JBOF) APPLIANCE WITH PHYSICAL ACCESS APPLICATION PROGRAM INTERFACE (API)

CROSS-REFERENCE TO RELATED APPLICATION

This application is based upon and claims the benefit of priority from Provisional Application No. 62/268,377, filed Dec. 16, 2015, the entire contents of which are incorporated herein by reference.

FIELD

The present disclosure is related to a storage array, a storage server, Just a Bunch of Flash (JBOF), a storage system, and software defined storage.

BACKGROUND

In a computing system of data storage, a host device that carries out data management may be connected one or more storage devices or one or more arrays of storage devices. The host device accesses the storage devices, i.e., writes data to and reads data from the storage devices by transmitting commands to the storage devices. In one type of a computing system, the host device is desired to have more initiative in management of data storing. As a result, the storage devices may not need to be less involved in the management of data storing.

DESCRIPTION OF THE DRAWINGS

FIG. 11 illustrates an example of a block mapping table according to the embodiment.

DETAILED DESCRIPTION

According to an embodiment, a storage array includes a first controller, memory, and one or more storage devices. Each of the storage devices comprises a second controller and a nonvolatile memory. The first controller receives a command and data from a host server connected to the storage array through a network and transmits a response or data to the host server. When receiving, from the host server, a write command, write data, and size information of the write data, the first controller sends the write command, the write data, and the size information to the second controller. The second controller determines a write address indicating a memory region of the nonvolatile memory in which the write data are to be written, based on the write command and the size information, writes the write data in the memory region associated with the write address, and transmits the write address to the first controller. The first controller further transfers the write address to the host server.

Details of the present disclosure are described below with reference to drawings.

[Storage System]

Figure 1:
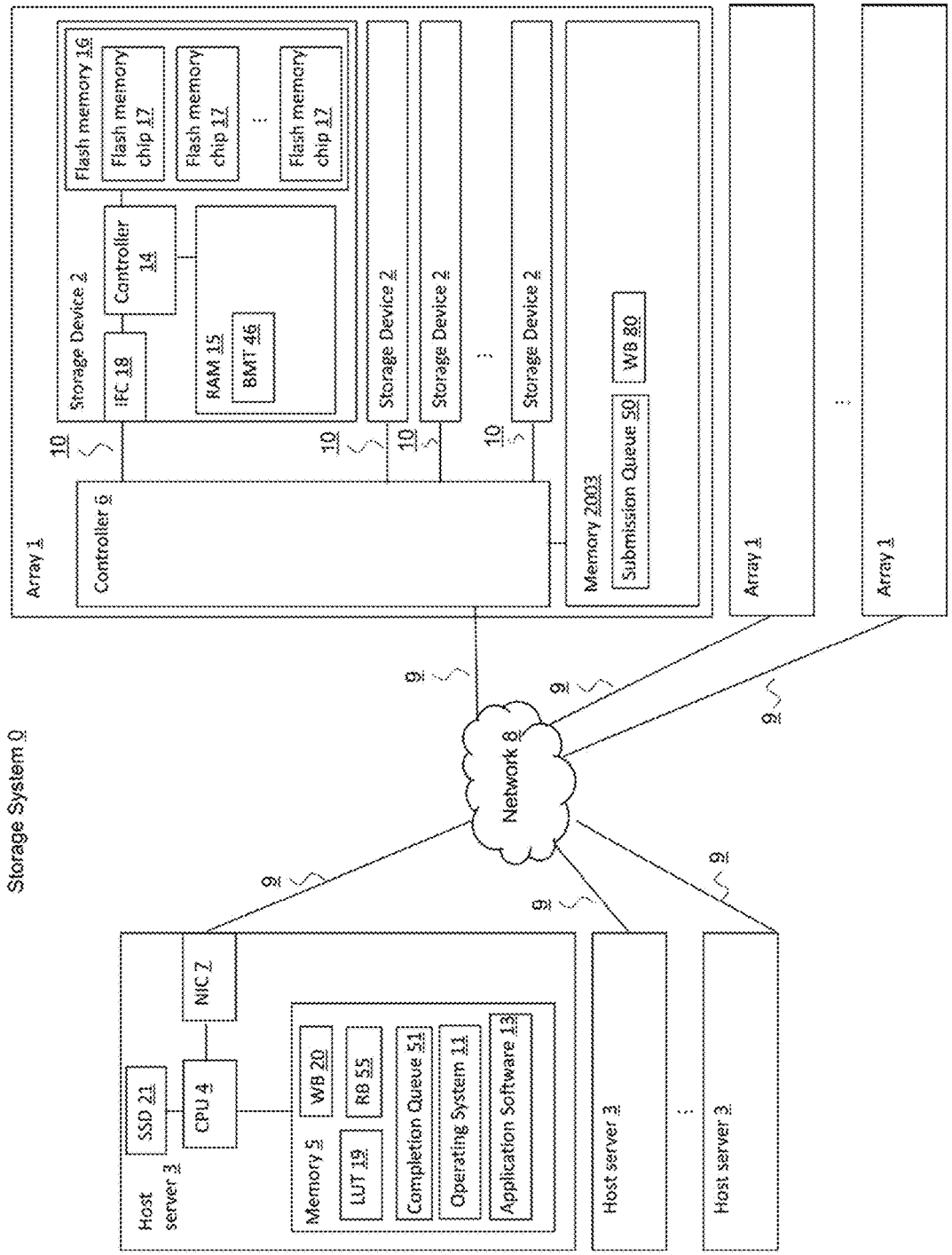
FIG. 1 illustrates a configuration of a storage system including a plurality of arrays and a plurality of host servers, according to an embodiment.
Figure 2:
FIG. 2 illustrates a physical configuration of the storage system.

FIG. 1 illustrates a configuration of a storage system 0 including a plurality of arrays 1 and a plurality of host servers 3, according to an embodiment. The plurality of arrays 1 and the plurality of host servers 3 are coupled to each other via a network 8. Each of the arrays 1 includes a controller 6, one or more storage devices 2, memory 2003, and an interface 10 configured to connect the controller 6 and each of the storage devices 2. In the present embodiment, as shown in FIG. 2, each of the arrays 1 is a 2 U (rack unit) storage appliance of JBOF (Just a Bunch of Flash), and each of the host servers 3 is a 2 U computing appliance (computing server). That is, each of the arrays 1 has a limited function, and data management and control of operations are basically carried out on the side of the host server 3. The arrays 1 passively operate upon receiving commands or requests from the host server 3.

FIG. 2 illustrates a physical structure of the storage system 0 according to the present embodiment. As shown in FIG. 2, at least one array 1 and one host server 3 are mounted on a rack 2000. Then, a plurality of racks 2000, each having the array 1 and the host server 3, is connected to each other via a network interface 9. The network interface 9 uses a protocol, for example, an Ethernet, InfiniBand, Fibre Channel, PCI Express Fabric, SAS (Serial Attached SCSI) protocol, WiFi, and the like.

The memory 2003 includes a write buffer (WB) 80 and a storage region for storing a submission queue 50.

The storage device 2 is a nonvolatile storage device such as a 2.5 inch form factor, 3.5 inch form factor, M.2 form factor or an Add-In Card (AIC) form factor. Further, in the present embodiment, the interface 10 uses PCI Express (Peripheral Component Interconnect Express, PCIe) interface. Alternatively, the interface 10 can use any other technically feasible protocol, such as SAS (Serial Attached SCSI) protocol, USB (Universal Serial Bus), SATA (Serial Advanced Technology Attachment), Thunderbolt (registered trademark), Ethernet (registered trademark), Fibre channel, and the like.

The storage device 2 includes a controller 14, a random access memory (RAM) 15, a non-volatile semiconductor memory, such as a NAND flash memory 16 (hereinafter flash memory), and an interface controller (IFC) 18. The IFC 18 is configured to perform transmission and reception of signals to and from the host server 3 via the interface 10. The controller 14 is configured to manage and control the flash memory 16, the RAM 15, and the IFC 18.

The RAM 15 is, for example, a volatile RAM, such as a DRAM (Dynamic Random Access Memory) and a SRAM (Static Random Access Memory), or a nonvolatile RAM, such as a FeRAM (Ferroelectric Random Access Memory), an MRAM (Magnetoresistive Random Access Memory), a PRAM (Phase Change Random Access Memory), and a ReRAM (Resistance Random Access Memory). The RAM 15 may be embedded in the controller 14.

The flash memory 16 includes one or more flash memory chips 17 and stores user data designated by one of the host servers 3 in one or more of the flash memory chips 17. The controller 14 and the flash memory 16 are connected via a flash memory interface 21, such as Toggle and ONFI.

In the present embodiment, the storage device 2 does not store a Flash Translation Layer (FTL) for converting a logical address to a physical address of the flash memory chip 17, because a location of the flash memory chip 17 as an access target is designated by the physical address, if the access target is determined, for example, when data are read from the flash memory chip 17.

Each of the host servers 3 includes a CPU (processing unit) 4, a memory 5, a controller 6, Solid State Drive (SSD) 21, and a Network Interface Controller (NIC) 7. The CPU 4 is a central processing unit in the host server 3, and performs various calculations and control operations in the host server 3. The CPU 4 and the NIC 7 are connected by an interface using a protocol such as PCI Express. The CPU 4 performs control of the storage device 2 via a network 8 and the controller 6. The controller 6 transforms protocols between the network interface 9 and the interface 10. The CPU 4 also performs control of the memory 5. The memory 5 is, for example, a DRAM (Dynamic Random Access Memory), a MRAM (Magnetoresistive Random Access Memory), a ReRAM (Resistance Random Access Memory), and a FeRAM (Ferroelectric Random Access Memory).

The CPU 4 is a processor configured to control the operation of the host server 3. The CPU 4 executes, for example, an operating system (OS) 11 loaded from one of the storage devices 2 to the memory 5. The CPU 4 is connected to the NIC 7, which is connected to the network 8 via the network interface 9.

The memory 5 temporarily stores a program and data, and functions as operational memory of the CPU 4. The memory 5 includes a storage region for storing Operating System (OS) 11, a storage region for storing application software 13A, a write buffer (WB) 20, a read buffer (RB) 5, a storage region for storing a look-up table (LUT) 19, and a storage region for storing completion queue 51. As is generally known, the OS 11 is a program for managing the entire host server 3, such as Linux, Windows Server, VMWARE Hypervisor, and etc., and operates to manage inputs to and outputs from the host server 3, the storage devices 2, and the memory 5, and enable software to use components in the storage system 1, including the storage devices 2. The OS 11 is used to control the manner of data writing to the storage device 2 and data reading from the storage device 2.

The write buffer (WB) 20 temporarily stores write data. The read buffer (RB) 5 temporarily stores read data. The LUT 19 stores mapping between object IDs and physical addresses of the flash memory 16 and the write buffer 20. That is, the host server 3 manages the mapping of data stored in the arrays 1. The submission queue 50 stores, for example, a command or a request with respect to the storage device 2. The completion queue 51 also stores information indicating completion of the command or the request and information related to the completion, when the command or the request is sent to the storage device 2.

The SSD 21 is a non-volatile storage device such as a BGA SSD form factor and a M.2 form factor. The SSD 21 stores boot information of the OS 11 and the application 13. The SSD 21 also stores journaling data and back-up data of metadata in the memory 5 such as the LUT 19.

The host server 3 sends, to the storage device 2 via the network interface 9 and the interface 10, a variety of commands for data writing to and data reading from the storage device 2. The commands include a write command, a read command, an invalidate command, a copy command, a monitor command, and the like, as described below in detail.

Figure 3:
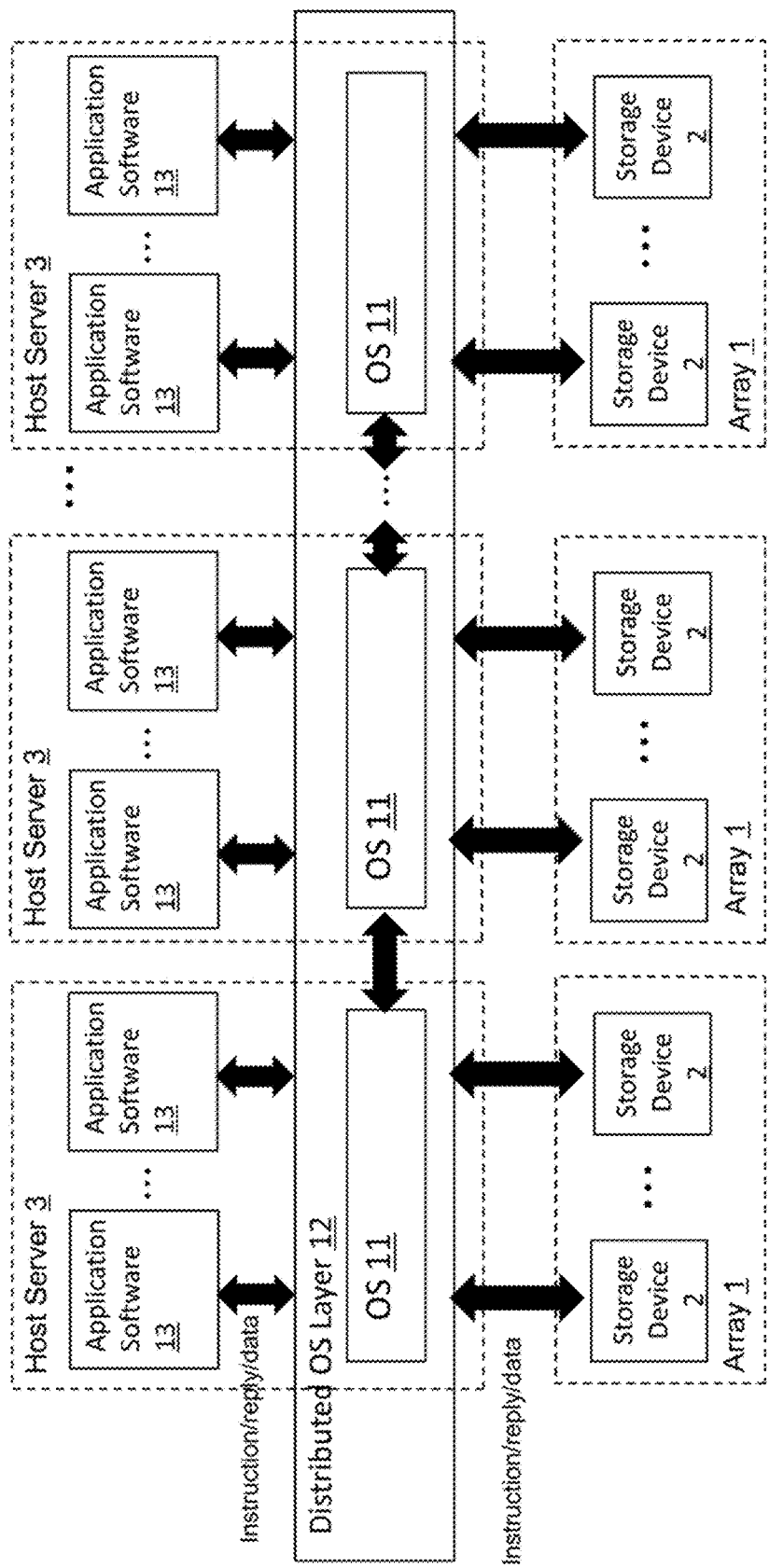
FIG. 3 illustrates a software layer structure of the storage system.

In addition, one or more units of the application software 13 are loaded, respectively, on the memory 5 of each host server 3. FIG. 3 illustrates a software layer structure of the host servers 3 according to the present embodiment. Usually, the application software 13 loaded on the memory 5 does not directly communicate with the storage device 2 and instead communicates with the storage device 2 through the OS 11 loaded to the memory 5 (vertical arrows in FIG. 3). The OS 11 of each host server 3 cooperates together via the network 8 (horizontal arrows in FIG. 3). By the plurality of OSs 11 in the plurality of host servers 3 cooperating with each other, the plurality of OSs 11 functions as a single distributed OS layer 12. By the distributed OS layer 12 virtualizing hardware such as the storage device 2, the application software 13 accesses the storage device 2 as software defined storage. According to the access type of the software defined storage realized by the distributed OS layer 12, the application software 13 can access the storage device 2 without considering geographic locations of the storage device 2.

The distributed OS layer 12 manages and virtualizes the plurality of the storage devices 2 of the plurality of arrays 1, so that the application software 13 can access the storage devices 2 transparently. When the application software 13 transmits to the storage device 2 a request, such as a read request or a write request, which is initiated by the host server 3, the application software 13 transmits the request to the OS 11, then the OS 11 determines which array 1 in the storage system 0 is to be accessed, and then the OS 11 transmits a command, the one or more physical addresses, and data associated with the one or more physical addresses, to the storage device 2 of the determined array 1 via the network interface 9 and the interface 10. Upon receiving a response from the storage device 2, the OS 11 transmits a response to the application software 13.

The application software 13 includes, for example, client software, database software (e.g., Cassandra D B, Mongo D B, HBASE, and etc.), Distributed Storage System (Ceph etc.), Virtual Machine (VM), guest OS, and Analytics Software (e.g., Hadoop, R, and etc.).

[Flash Memory Chip]

Figure 4:
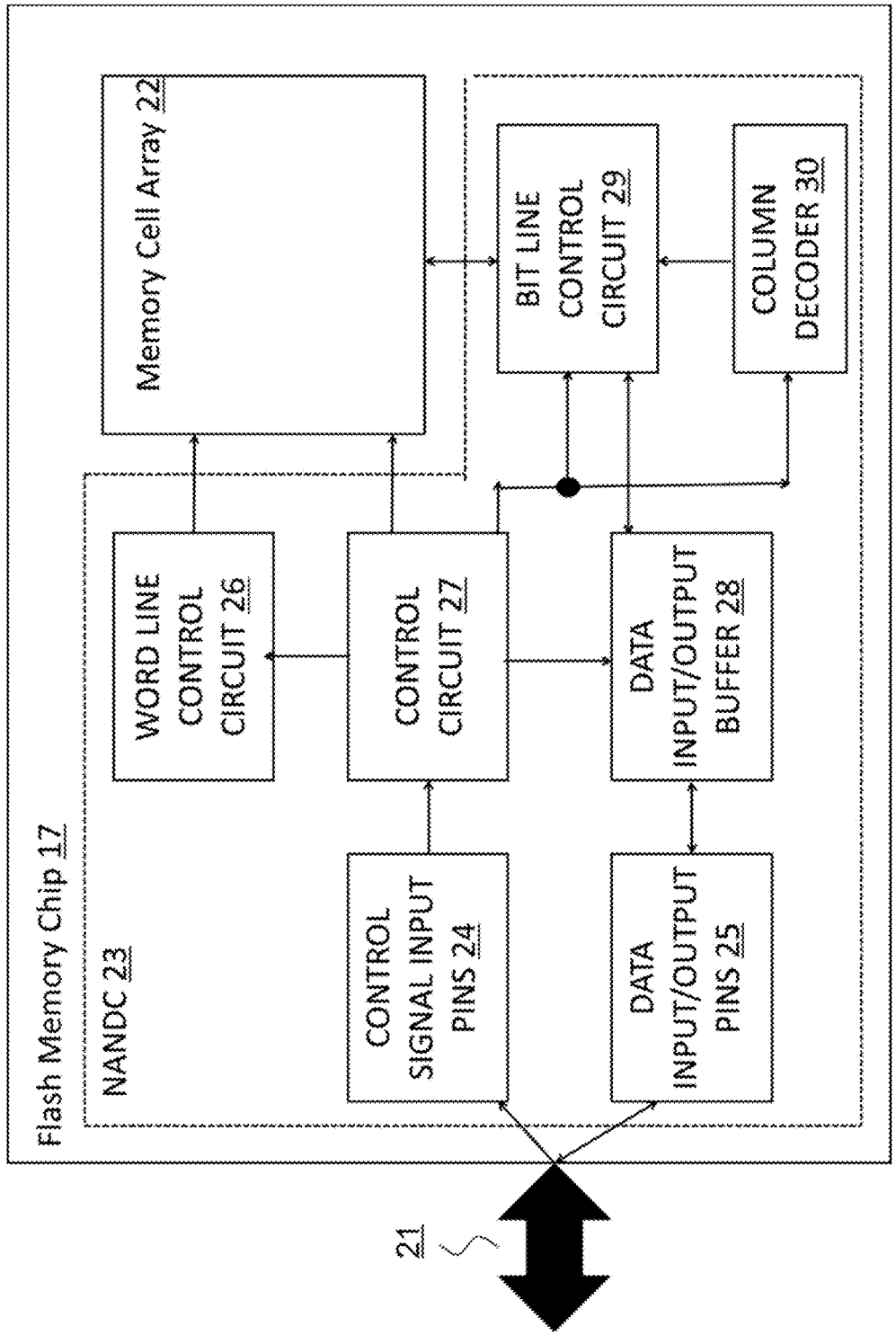
FIG. 4 illustrates a configuration of a flash memory chip in each of the arrays.

FIG. 4 illustrates a configuration of the flash memory chip 17. The flash memory chip 17 includes a memory cell array 22 and a NAND controller (NANDC) 23. The memory cell array 22 includes a plurality of memory cells arranged in a matrix configuration, each stores data, as described below in detail. The NANDC 23 is a controller configured to control access to the memory cell array 22.

Specifically, the NANDC 23 includes signal input pins 24, data input/output pins 25, a word line control circuit 26, a control circuit 27, a data input/output buffer 28, a bit line control circuit 29, and a column decoder 30. The control circuit 27 is connected to the signal input pins 24, the word line control circuit 26, the data input/output buffer 28, the bit line control circuit 29, and the column decoder 30, and entirely controls circuit components of the NANDC 23. Also, the memory cell array 22 is connected to the word line control circuit 26, the control circuit 27, and the data input/output buffer 28. Further, the signal input pins 24 and the data input/output pins 25 are connected to the controller 14 of the storage device 2, through the flash interface 21.

When data are read from the flash memory chip 17, data in the memory cell array 22 are output to the bit line control circuit 29 and then temporarily stored in the data input/output buffer 28. Then, the read data RD are transferred to the controller 14 of the storage device 2 from the data input/output pins 25 through the flash interface 21. When data are written to the flash memory chip 17, data to be written (write data WD) are input to the data input/output buffer 28 through the data input/output pins 25. Then, the write data WD are transferred to the column decoder 30 through the control circuit 27, and input to the bit line control circuit 29 by the column decoder 30. The write data WD are written to memory cells of the memory cell array 22 with a timing controlled by the word line control circuit 26 and the bit line control circuit 29.

When control signals CS are input to the flash memory chip 17 from the controller 14 of the storage device 2 through the flash interface 21, the control signals CS are input through the control signal input pins 24 into the control circuit 27. Then, the control circuit 27 generates control signals CS', according to the control signals CS from the controller 14, and controls voltages for controlling memory cell array 22, bit line control circuit 29, column decoder 30, data input/output buffer 28, and word line control circuit 26. Here, a circuit section that includes the circuits other than the memory cell array 22 in the flash memory chip 17 is referred to as the NANDC 23.

Figure 5:
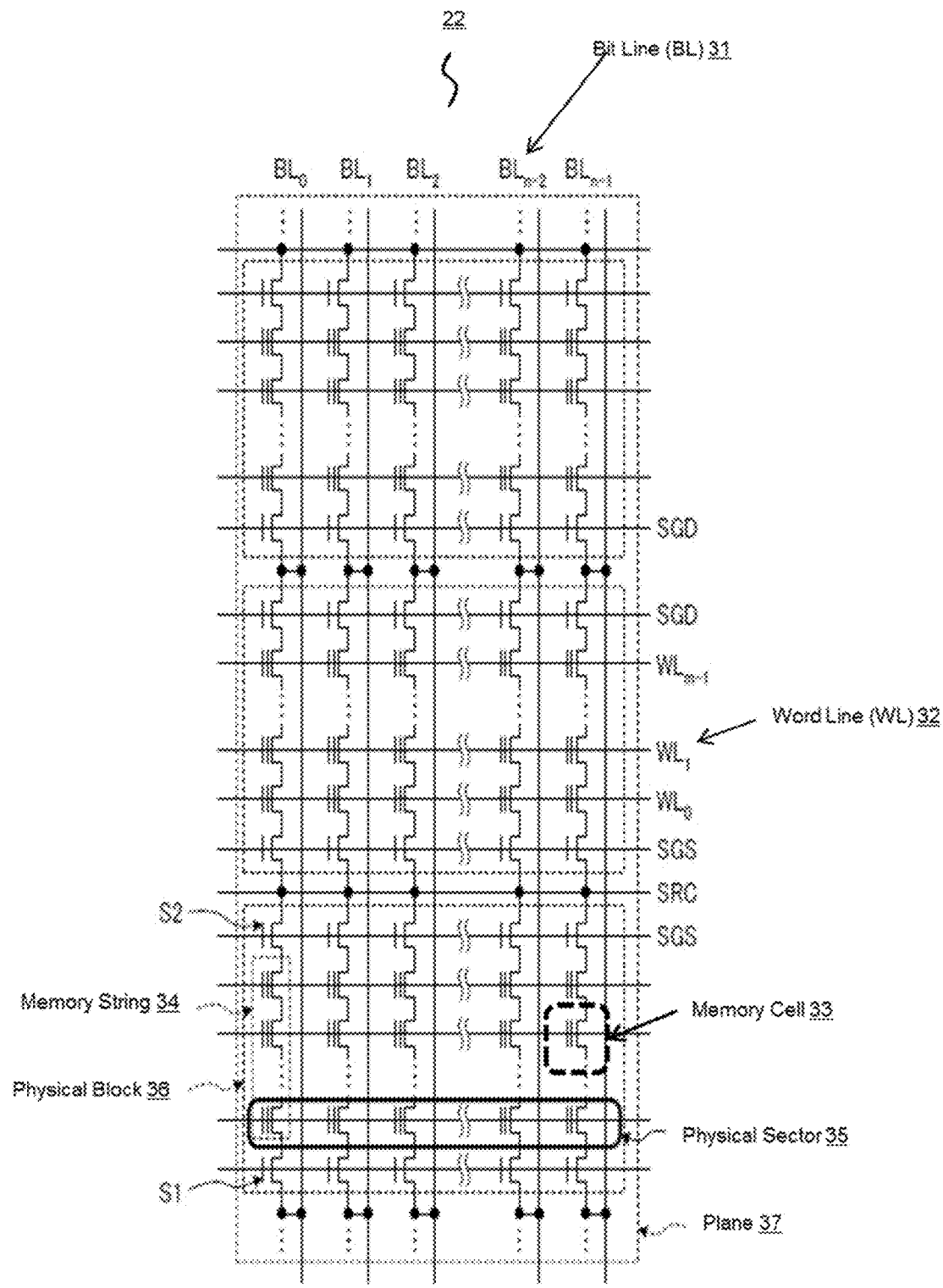
FIG. 5 illustrates a detailed circuit structure of a memory cell array in the flash memory chip.

FIG. 5 illustrates a detailed circuit structure of the memory cell array 22. The memory cell array 22 includes one or more planes 37, each plane 37 includes a plurality of physical blocks 36, and each physical block 36 includes a plurality of memory strings 34. Further, each of the memory strings (MSs) 34 includes a plurality of memory cells 33.

The Memory cell array 22 further includes a plurality of bit lines 31, a plurality of word lines 32, and a common source line. The memory cells 33, which are electrically data-rewritable, are arranged in a matrix configuration at intersections of bit lines 31 and the word lines. The bit line control circuit 29 is connected to the bit lines 31 and the word line control circuit 26 is connected to the controlling word lines 32, so as to control data writing and reading with respect to the memory cells 33. That is, the bit line control circuit 29 reads data stored in the memory cells 33 via the bit lines 31 and applies a write control voltage to the memory cells 33 via the bit lines 31 and writes data in the memory cells 33 selected by the word line 32.

In each MS 34, the memory cells 33 are connected in series, and selection gates S1 and S2 are connected to both ends of the MS 34. The selection gate S1 is connected to a bit line BL 31 and the selection gate S2 is connected to a source line SRC. Control gates of the memory cells 33 arranged in the same row are connected in common to one of word lines 32 WL0 to WLm−1. First selection gates S1 are connected in common to a select line SGD, and second selection gates S2 are connected in common to a select line SGS.

A plurality of memory cells 33 connected to one word line 32 configures one physical sector 35. Data are written and read for each physical sector 35. In the one physical sector 35, data equivalent to two physical pages (two pages) are stored when 2 bit/cell write system (MLC, four-level) is employed, and data equivalent to one physical page (one page) are stored when 1 bit/cell write system (SLC, two-level) is employed. Further, when 3 bit/cell write system (TLC, eight-level) is employed, data equivalent to three physical pages (three pages) are stored in the one physical sector 35. Further, data are erased in a unit of the physical block 36.

During a write operation, a read operation, and a program verify operation, one word line WL is selected according to a physical address, such as a Row Address, received from the controller 14, and, as a result, one physical sector 35 is selected. Switching of a page in the selected physical sector 35 is performed according to a physical page address in the physical address. In the present embodiment, the flash memory 16 employs the 2 bit/cell write method, and the controller 14 controls the physical sector 35, recognizing that two pages, i.e., an upper page and a lower page, are allocated to the physical sector 35, as physical pages. A physical address comprises physical page addresses and physical block address. A physical page address is assigned to each of the physical pages, and a physical block address is assigned to each of the physical blocks 36.

Figure 6:
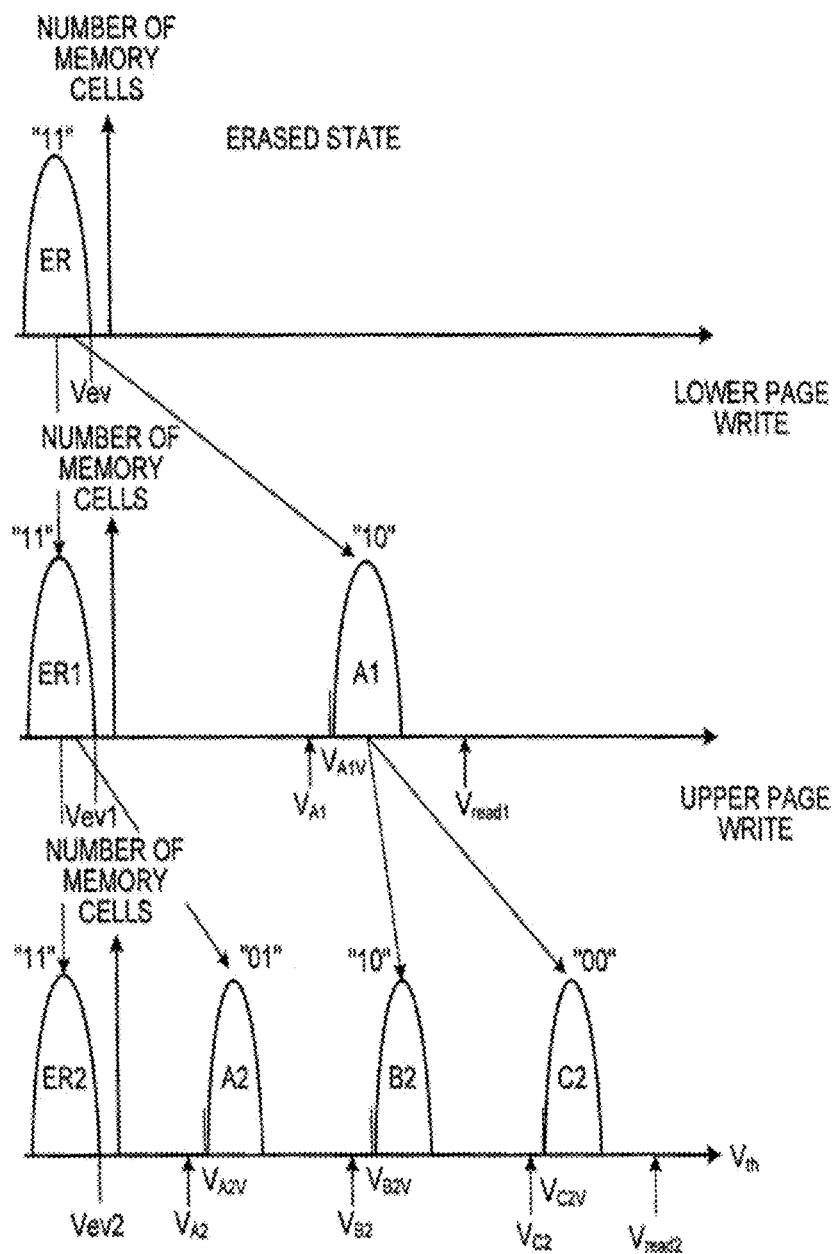
FIG. 6 illustrates a relation between 2-bit four-level data (data "11", "01", "10", and "00") stored in a memory cell of a four-level NAND cell type and a threshold voltage distribution of each level.

The four-level NAND memory of 2 bit/cell is configured such that a threshold voltage in one memory cell could have four kinds of distributions. FIG. 6 illustrates a relation between 2-bit four-level data (data "11", "01", "10", and "00") stored in a memory cell 33 of a four-level NAND cell type and a threshold voltage distribution of each level. 2-bit data of one memory cell 33 includes lower page data and upper page data. The lower page data and the upper page data are written in the memory cell 33 according to separate write operations, i.e., two write operations. Here, when data are represented as "XY," "X" represents the upper page data and "Y" represents the lower page data.

Each of the memory cells 33 includes a memory cell transistor, for example, a MOSFET (Metal Oxide Semiconductor Field Effect Transistor) having a stacked gate structure formed on a semiconductor substrate. The stacked gate structure includes a charge storage layer (a floating gate electrode) formed on the semiconductor substrate via a gate insulating film and a control gate electrode formed on the floating gate electrode via an inter-gate insulating film. A threshold voltage of the memory cell transistor changes according to the number of electrons accumulated in the floating gate electrode. The memory cell transistor stores data according to difference in the threshold voltage.

In the present embodiment, each of the memory cells 33 employs a write system of a four-level store method for 2 bit/cell (MLC), using an upper page and a lower page.

Alternatively, the memory cells 33 may employ a write system of a two-level store method of 1 bit/cell (SLC), using a single page, an eight-level store method for 3 bit/cell (TLC), using an upper page, a middle page, and a lower page, or a multi-level store method for 4 bit/cell (QLC) or more, or mixture of them. The memory cell transistor is not limited to the structure including the floating gate electrode and may be a structure such as a MONOS (Metal-Oxide-Nitride-Oxide-Silicon) type that can adjust a threshold voltage by trapping electrons on a nitride interface functioning as a charge storage layer. Similarly, the memory cell transistor of the MONOS type can be configured to store data of one bit or can be configured to store data of a multiple bits. The memory cell transistor can be, as a nonvolatile storage medium, a semiconductor storage medium in which memory cells are three-dimensionally arranged as described in U.S. Pat. No. 8,189,391, United States Patent Application Publication No. 2010/0207195, and United States Patent Application Publication No. 2010/0254191.

[Storage Device]

Figure 7:
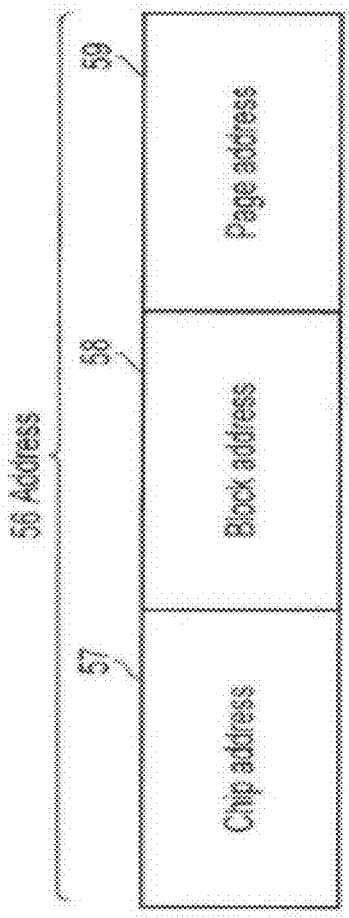
FIG. 7 illustrates a first example of an address structure according to the embodiment.

FIG. 7 illustrates a first example of an address structure 56 according to the present embodiment. Physical addresses are transmitted via the network interface 9 and the interface 10 as a form of the address structure 56. The address structure 56 includes a chip address 57, a block address 58, and a page address 59. In the present embodiment, the chip address 57 is located at MSB (most significant bit) of the address structure 56, and the page address 59 is located at LSB (least significant bit) of the address structure 56, as shown in FIG. 7. The locations of the chip address 57, the block address 58, and the page address 59 can be determined arbitrarily.

Figure 8:
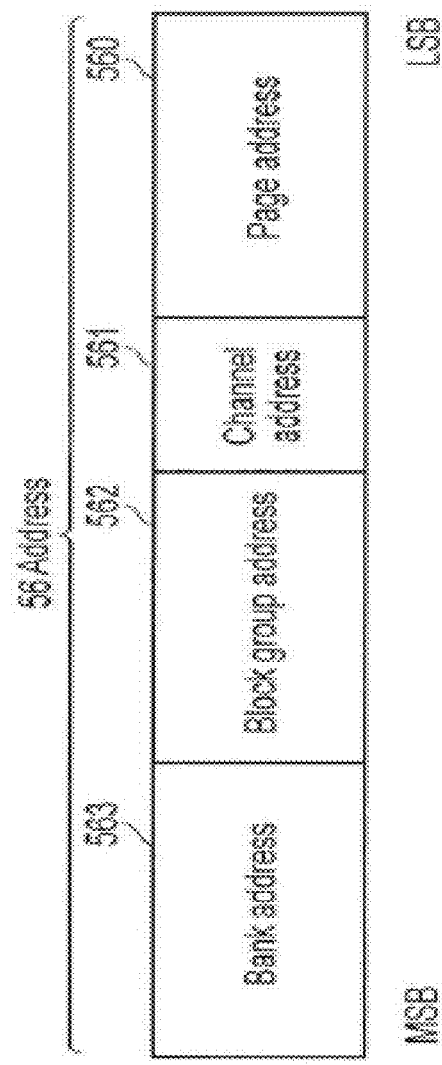
FIG. 8 illustrates a second example of the address structure according to the embodiment.

FIG. 8 illustrates a second example of the address structure 56 according to the present embodiment. The address 56 includes a bank address 563, a block group address 562, a channel address 561, and a page address 560. The bank address 563 corresponds to the chip address in FIG. 7. The block group address 562 corresponds to the block address 58 in FIG. 7. The channel address 561 and the page address 560 correspond to the page address 59 in FIG. 7.

Figure 9:
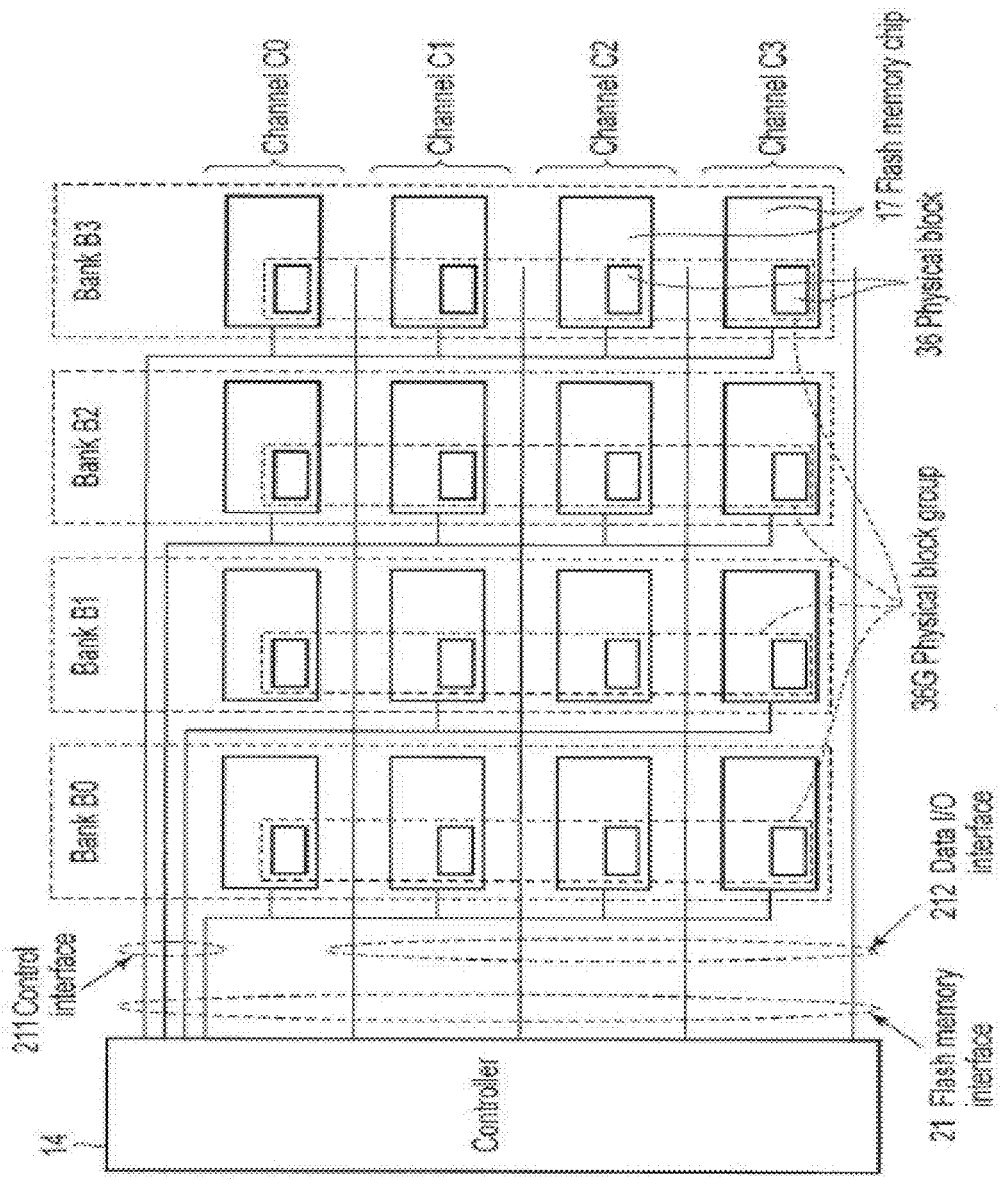
FIG. 9 illustrates a third example of an address structure according to the embodiment.

FIG. 9 is a block diagram of a configuration of the non-voluntary memory according to the present embodiment. FIG. 9 illustrates elements corresponding to each of the addresses shown in FIG. 8. In FIG. 9, the plurality of flash memory chips 17 are specified by channel groups C0-C3 and bank groups B0-B3, which intersect with each other. The flash memory interface 21 between the controller 14 and the flash memory chip 17 includes a plurality of data I/O interfaces 212 and a plurality of control interfaces 211. Flash memory chips 17 that share a common data I/O interface 212 belong to a common channel group. Similarly, flash memory chips 17 that share a common bus of the control interface 211 belong to a common bank group.

According to this sharing of the bus, a plurality of flash memory chips 17 that belong to the same bank group can be accessed in parallel through driving of the plurality of channels. Also, the plurality of banks can be operated in parallel through an interleave access. The controller 14 fetches, from the submission queue 50, a command to access a bank in an idle state in priority to a command to access a busy bank, in order to perform a more efficient parallel operation. Physical blocks 36 that belong to the same bank and are associated with the same physical block address belong to the same physical block group 36G, and assigned a physical block group address corresponding to the physical block address.

In an embodiment, the physical block group 36G of the plurality of physical blocks 36 is set as a unit of erasing data, and the physical block group address is set as a management unit in the block mapping table (BMT) 46. As a result, the size of the BMT 46 can be reduced, and the size of the RAM 15 can be reduced. More specifically, the size of the BMT 46 that is loaded when the storage device 2 is booted can be reduced, and as a result, the boot time of the storage device 2 can be shortened.

Figure 10:
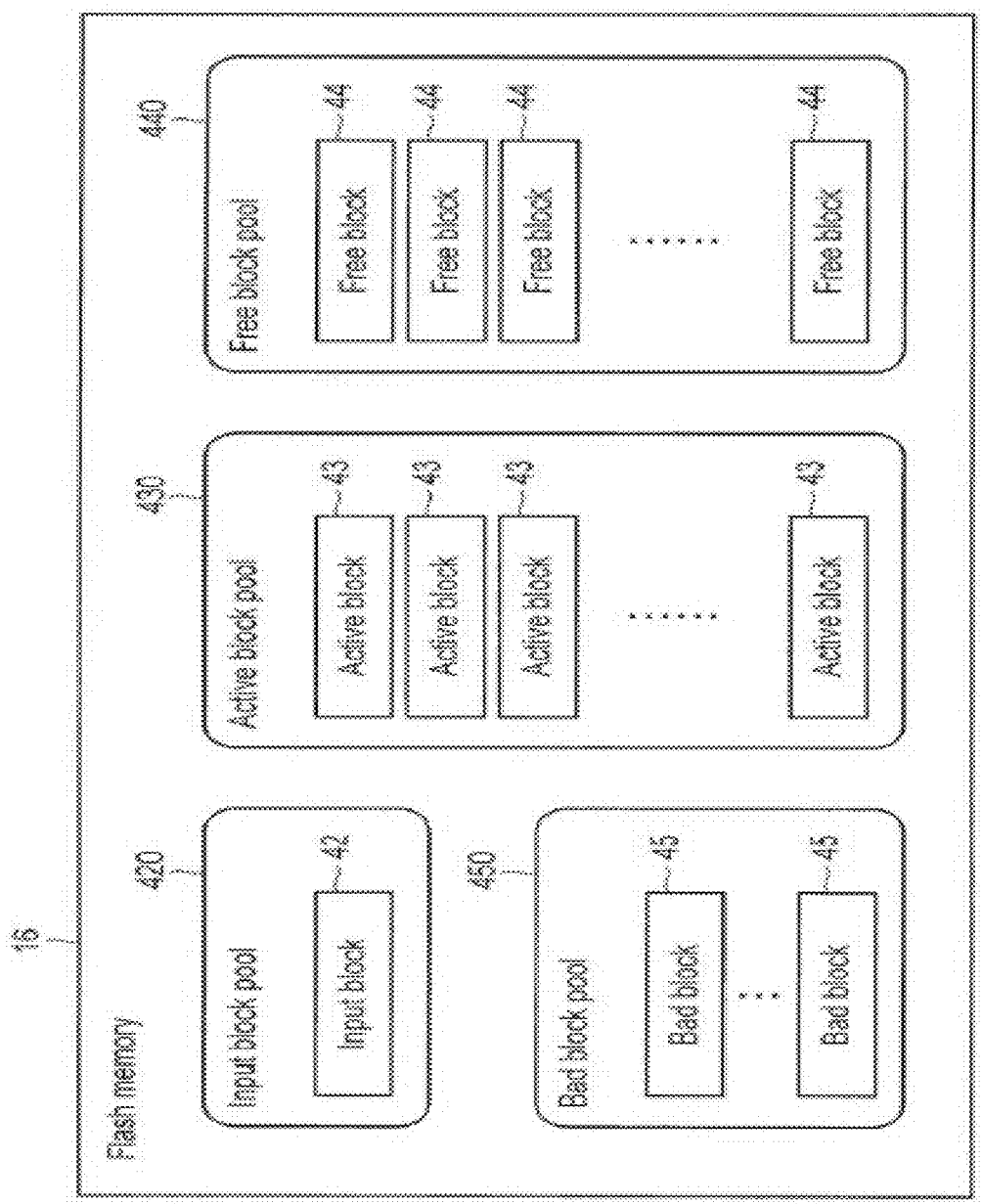
FIG. 10 illustrates an overview of mapping of physical blocks based on block pools in the embodiment.

FIG. 10 illustrates an overview of mapping of physical blocks based on block pools in the present embodiment. The block pools include a free block pool 440, an input block pool 420, an active block pool 430, and a bad block pool 450. The mappings of physical blocks are managed by the controller 14 using a block mapping table (BMT) 46. The controller 14 maps each of the physical blocks 36 to any of the block pools, in the BMT 46.

The free block pool 440 includes one or more free blocks 44. The free block 44 is a block that does not store valid data. That is, all data stored in the free block 44 are invalidated.

The input block pool 420 includes an input block 42. The input block 42 is a block in which data are written. The input block 42 may store no data, if data therein have been erased, or include a written region that stores data and an unwritten region in which data can be written.

The input block 42 is generated from a free block 44 in the free block pool 440. For example, a free block 44 that has been subjected to erasing operations the smallest number of times may be selected as a target block to be changed to the input block 42. Alternatively, a free block 44 that has been subjected to erasing operations less than a predetermined number of times may be selected as the target block.

The active block pool 430 includes one or more active blocks 43. The active block 43 is a block that no longer has a writable region (i.e., becomes full of valid data).

The bad block pool 450 includes one or more bad blocks 45. The bad block 45 is a block that cannot be used for data writing, for example, because of defects.

FIG. 11 illustrates an example of the BMT 46 according to the present embodiment. The BMT 46 includes a free block table 461, an active block table 462, a bad block table 463, and an input block table 464. The BMT 46 manages a physical block address list of the free blocks 44, the input block 42, the active blocks 43, and the bad blocks 45, respectively. Other configurations of different types of block pools may be also managed in the BMT 46.

The input block table 464 also manages a physical page address to be written (PATBW), which indicates an address in which next data will be written, with respect to each input block 42. When the controller 14 maps a block from the free block pool 440 as the input block 42, the controller 14 removes a block address of the block from the free block table 461, adds an entry including the block address and PATBW=0 to the input block table 464.

When the controller 14 processes a write operation of data to the input block 42, the controller 14 identifies a PATBW by referring to the input block table 464, writes the data to the page address in the input block 42, and increments the PATBW in the input block table 464 (PATBW=PATBW+ written data size). When the PATBW exceeds maximum page address of the block, the controller 14 re-maps the block from the input block pool 420 as the active block pool 430.

[Write Operation]

Figure 12:
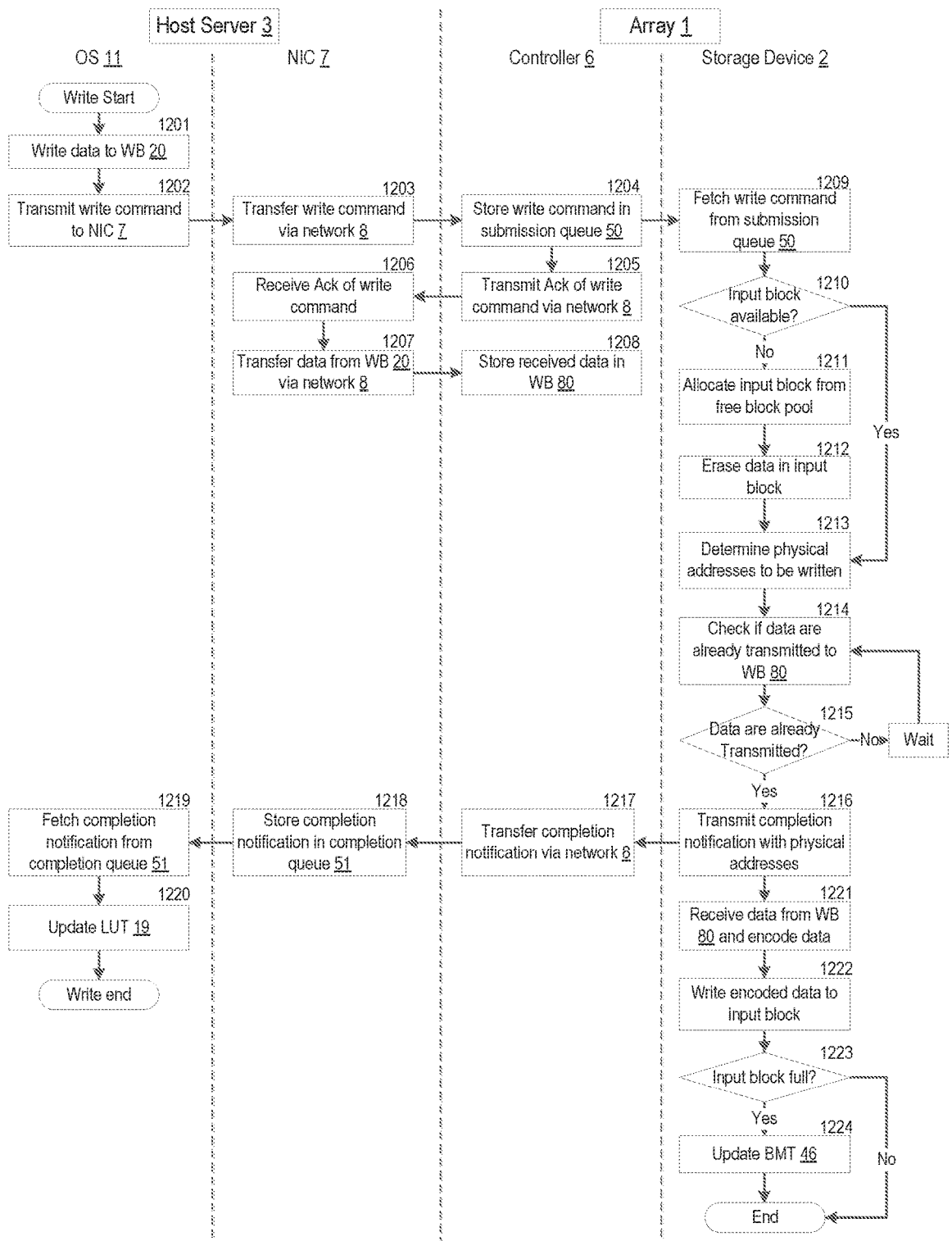
FIG. 12 is a flow chart showing an example of a write operation performed by OS in the host server and the array (storage device).

FIG. 12 is a flow chart showing an example of a write operation performed by the OS 11 and the storage device 2, in the storage system 0 according to the present embodiment. In the write operation, the OS 11 accesses the storage device 2 via the network 8 and the interface 10.

In step 1201, the OS 11 stores write data in the write buffer 20. Instead of storing the write data, a pointer indicating a region of the memory 5 in which the write data has been already stored may be stored in the write buffer 20 of the corresponding host sever 3.

In step 1202, the OS 11 transmits a write command to the NIC 7. Then, in step 1203, the NIC 7 transfers the write command to the controller 6 via the network 8. The write command contains a size of data to be written, but does not contain an address in which the write data are to be written.

In step 1204, the controller 6 receives the write command via the network 8 and stores the write command into the submission queue 50. Then, in step 1205, the controller 6 transmits an acknowledgement of the write command to the NIC 7 via the network 8. Receiving the acknowledgement in step 1206, the NIC 7 transfers the write data from the WB 20 to the controller 6 via the network 8 in step 1207. In step 1208, the controller 6 receives the write data and stores the write data in the WB 80.

In step 1209, the controller 14 fetches the write command from the submission queue 50 via the interface 10. In step 1210, the controller 14 determines whether or not the input block 42 is available for storing the write data. If the input block 42 is determined to be not available (No in step 1210), the process proceeds to step 1211. If the input block 42 is determined to be available (Yes in step 1210), the process proceeds to step 1213.

In step 1211, the controller 14 generates (remaps) the input block 42 from the free block pool 440 by updating the BMT 46. In step 1212, the controller 14 erases data in the generated input block 42.

In step 1213, the controller 14 determines physical addresses (chip address, block address, and page address) of a memory region of the flash memory chip 17 in which the write data are to be written.

In steps 1214 and 1215, the controller 14 waits until all write data are transmitted from the host server 3 to the WB 80.

In step 1216, the controller 14 transmits a completion notification and the physical addresses, which were determined in step 1213, to the controller 6. In step 1217, the controller 6 transfers them to the NIC 7. Then in step 1218, the NIC 7 stores them into the completion queue 51. Instead of embedding an address entry list in the completion notification, the NIC 7 may embed a pointer containing the address entry list.

In step 1219, the OS 11 fetches the write completion notification from the completion queue 51 and updates the LUT 19. In step 1220, the OS 11 updates the LUT 19 to map a file ID or an object ID of the write data to the physical address or addresses of the flash memory chip 17 in which the write data have been written.

In step 1221, the controller 14 receives the write data from the WB 80 via the interface 10 and encodes the write data. In step 1222, the controller 14 writes the encoded write data into the input block 42 associated with the determined physical addresses.

In step 1223, the controller 14 determines whether or not the input block 42 becomes full. If the input block 42 is determined to become full (Yes in step 1223), in step 1224, the controller 14 updates the BMT 46 to remap the input block 42 as the active block 43. If the input block 42 is determined to not become full (No in step 1223), then the process ends.

Figure 13:
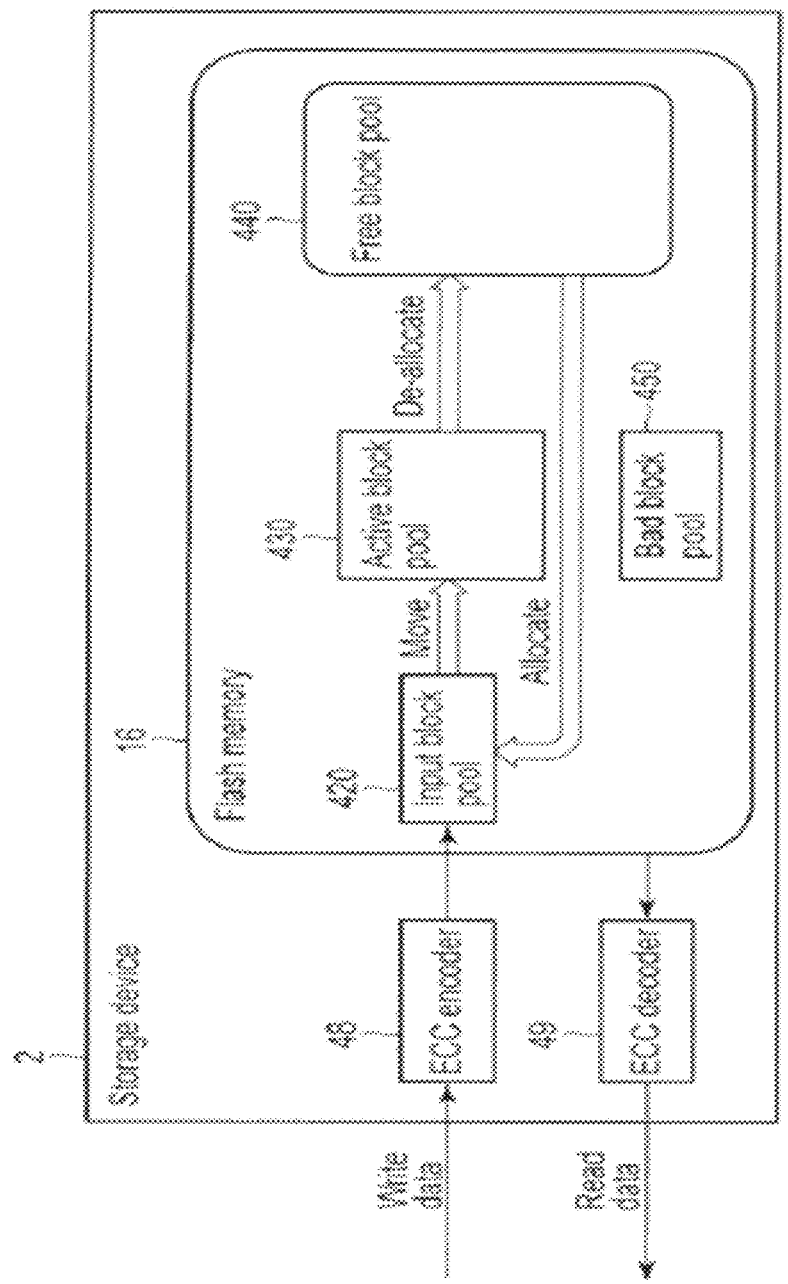
FIG. 13 illustrates a first example of an architecture overview of the storage device for the write operation.

FIG. 13 illustrates a first example of an architecture overview of the storage device 2 of the present embodiment for the write operation, during which the controller 14 writes the write data from the write buffer memory 80 to the flash memory 16. The physical block 36 belongs to any of the input block pool 420, the active block pool 430, the free block pool 440, or the bad block pool 450.

The controller 14 receives the write data from the write buffer memory 80 via the interface 10 and encodes the write data using an ECC encoder 48 in the controller 14. Also, the controller 14 decodes read data using an ECC decoder 49 in the controller 14.

When the controller 14 writes the write data from the write buffer memory 80 to the flash memory 16, the controller 14 looks up physical addresses of pages in the input block 42 of the input block pool 420 in which the write data are to be written by referring to the BMT 46. When there is no available input block 42 in the flash memory 16, the controller 14 assigns (remaps) a new input block 42 from the free block pool 440. When no physical page in the input block 42 is available for data writing without erasing data written therein, the controller 14 remaps the block as the active block pool 430. The controller 14 de-allocates a block of the active block pool to the free block pool 440.

Figure 14:
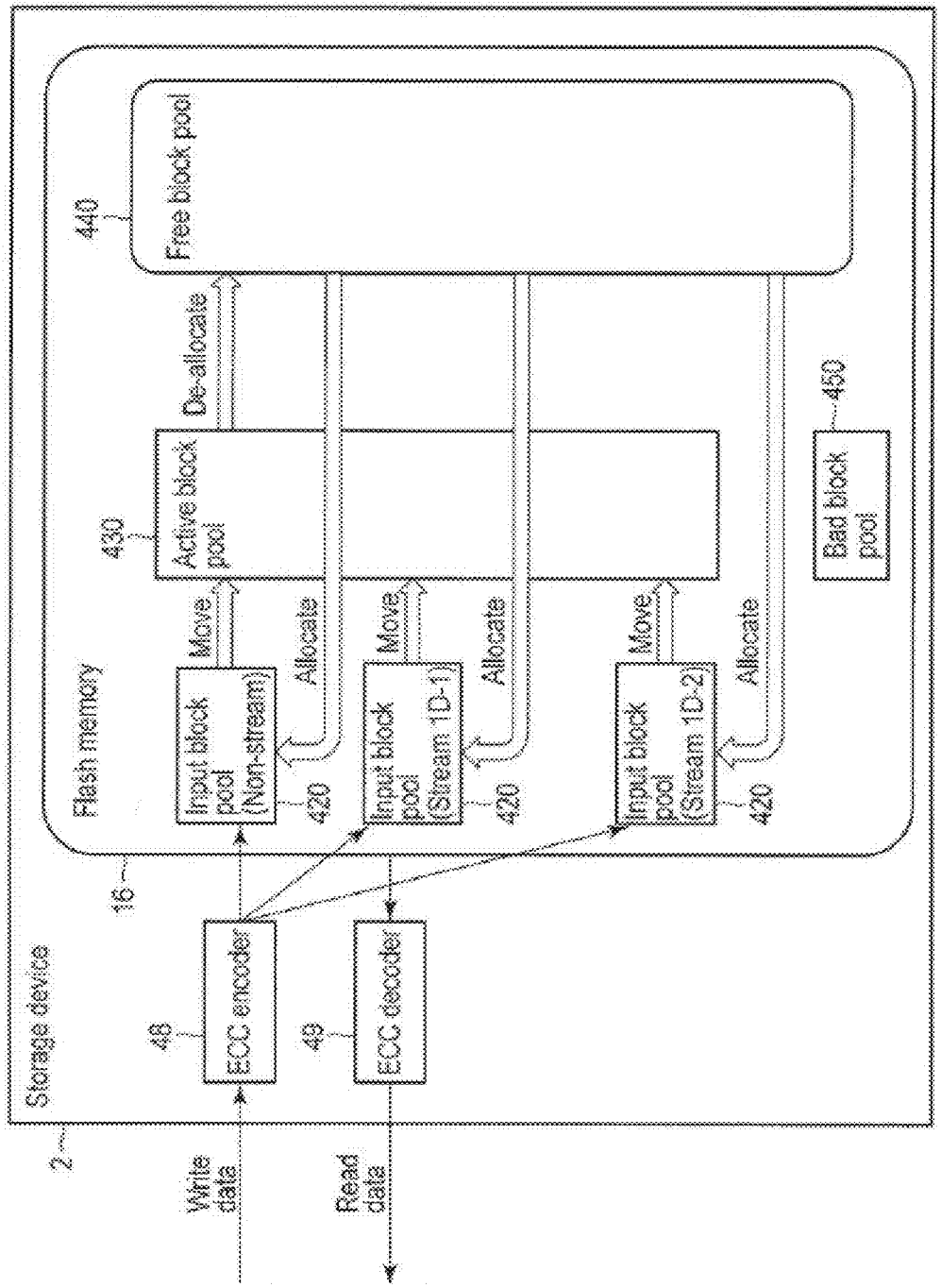
FIG. 14 illustrates a second example of the architecture overview of the storage device for the write operation.

FIG. 14 illustrates a second example of the architecture overview of the storage device 2 for the write operation. In this architecture, two or more input blocks 42 of two or more input block pools 420 for writing data are prepared with respect to each stream ID, and write data associated with a certain stream ID are stored in a physical block associated with the stream ID. The write command includes the stream ID as another parameter in this example. When the OS 11 posts the write command specifying the stream ID to the submission queue 50, the controller 14 writes the write data from the write buffer memory 80 to the input block 42 corresponding to the specified stream ID. When the OS 11 posts the write command that does not specify the stream ID to the submission queue 50, the controller 14 writes the write data from the write buffer memory 80 to the input block 42 corresponding to non-stream group. By storing the write data in accordance with the stream ID, the type of data (or lifetime of data) stored in the physical block 36 can be uniform, and as a result, it is possible to increase a probability that the data in the physical block can be deleted without transferring part of the data to another physical block 36 when the garbage collection operation is performed.

Figure 15:
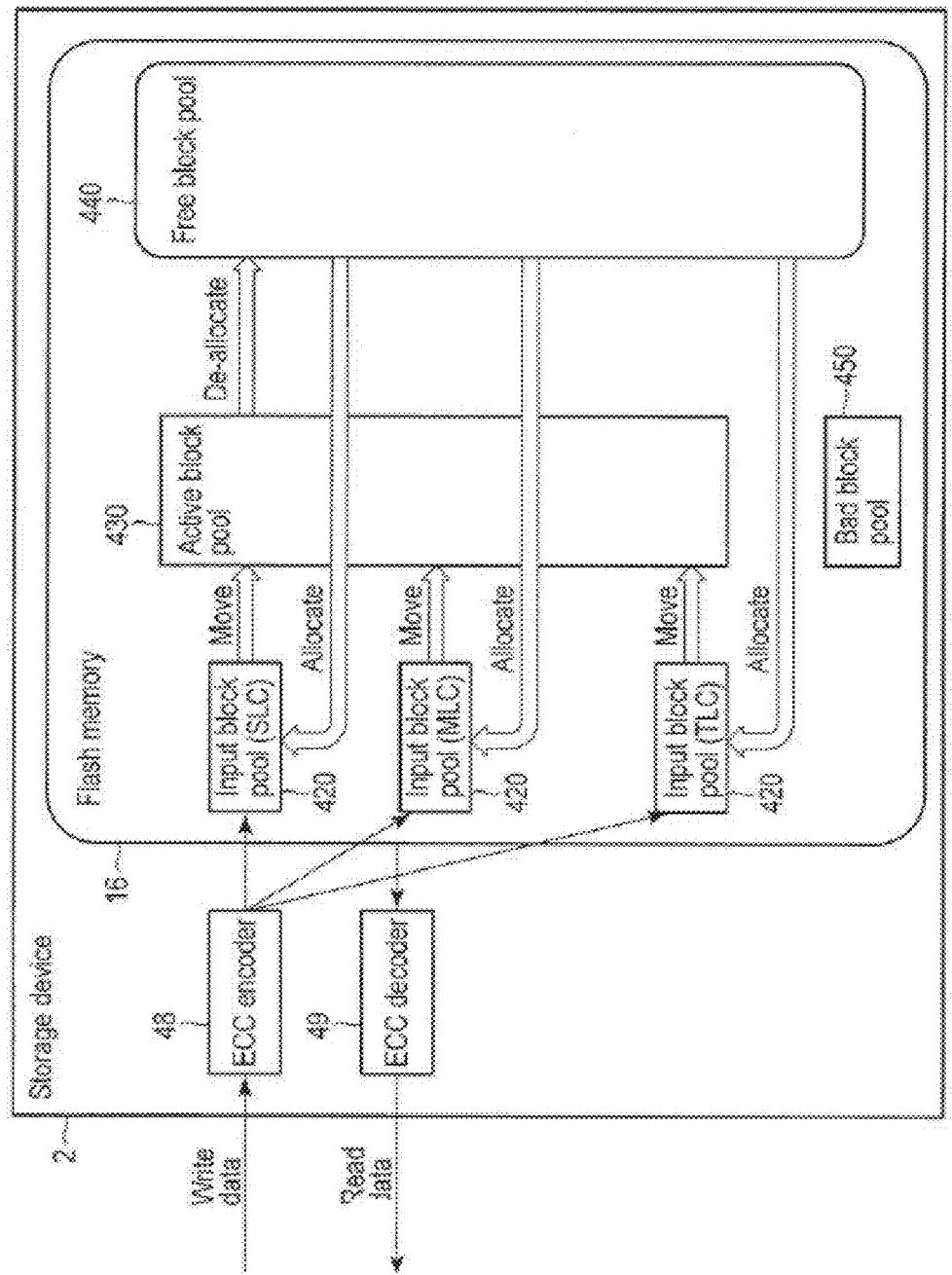
FIG. 15 illustrates a third example of the architecture overview of the storage device for the write operation.

FIG. 15 illustrates a third example of the architecture overview of the storage device 2 for the write operation. In this architecture, two or more input blocks 42 for writing data are prepared with respect to n bit/cell write system, and the write data are stored in the physical block 36 in one of SLC, MLC, and TLC manner. The write command includes a bit density (BD) as another parameter in this example.

When the OS 11 posts the write command specifying BD=1 to the submission queue 50, the controller 14 writes the write data from the write buffer memory 80 to the input block 42 in 1 bit/cell manner (SLC). When the OS 11 posts the write command specifying BD=2 to the submission queue 50, the controller 14 writes the write data from the write buffer memory 80 to the input block 42 in 2 bit/cell manner (MLC). When the OS 11 posts the write command specifying BD=3 to the submission queue 50, the controller 14 writes the write data from the write buffer memory 80 to the input block 42 in 3 bit/cell manner (TLC). When the OS 11 posts the write command specifying BD=0 to the submission queue 50, the controller 14 writes the write data from the write buffer memory 80 to the input block 42 in default manner which is one of SLC, MLC, and TLC.

Writing data by the SLC manner has highest write performance and highest reliability, but has lowest data density. Writing data by MLC manner has highest data density, but has lowest write performance and lowest reliability. According to this example, the OS 11 can manage and control a write speed, density, and reliability of the input block 420 by controlling bit density.

[Remote Read Operation]

Figure 16:
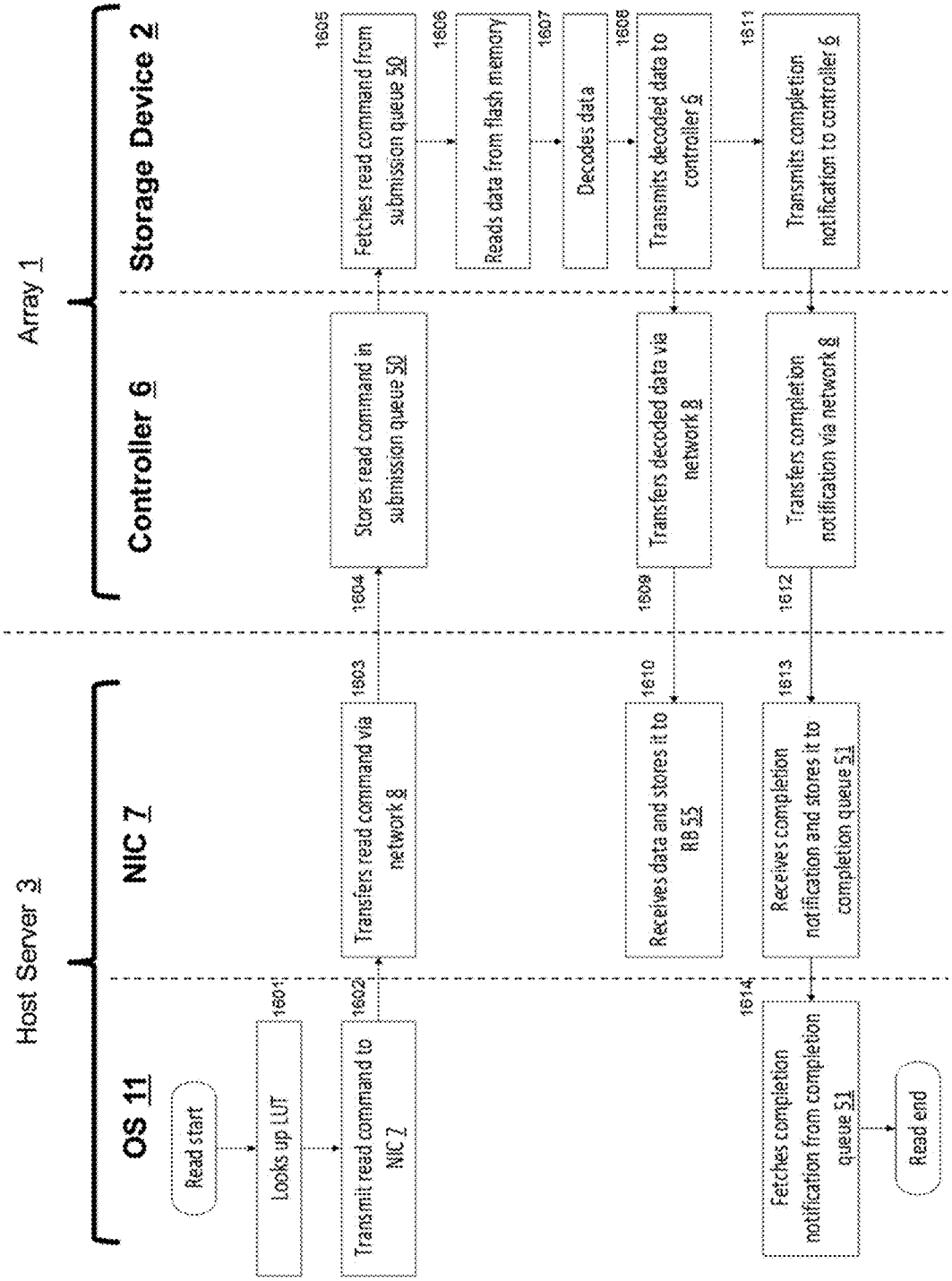
FIG. 16 is a flow chart showing an example of a read operation performed by the OS and the array (storage device).

FIG. 16 is a flow chart showing an example of a read operation performed by the OS 11 and the storage device 2. In the read operation, the OS 11 accesses the storage device 2 via the network 8 and the interface 10.

In step 1601, the OS 11, by referring to the LUT 19, converts a File ID or an object ID to one or more physical addresses 56 of memory regions from which data are to be read.

In step 1602, the OS 11 transmits a read command to the NIC 7. Then, in step 1603, the NIC 7 transfers the read command to the controller 6 via the network 8. In step 1604, receiving the read command, the controller 6 stores the read command in the submission queue 50. The read command contains address entries which includes the physical addresses 56 of the memory regions from which the data are to be read and a size of the data to be read.

In step 1605, the controller 14 fetches the read command from the submission queue 50 via the interface 10.

In step 1606, the controller 14 reads the data (read data) from the memory regions associated with the physical addresses 56 of the flash memory 16 without converting the physical addresses 56 (without address conversion by a Flash Translation Layer (FTL)).

In step 1607, the controller 14 decodes the read data using the ECC decoder 49 in the controller 14.

In step 1608, the controller 14 transmits the decoded read data to the controller 6 via the interface 10. Then, in step 1609, the controller 6 transfers the decoded read data to the NIC 7 via the network 8. Then, in step 1610, the NIC 7 stores the data in RB 55.

Further, in step 1611, the controller 14 transfers a read completion notification to the controller 6 via the interface 10. Then, in step 1612, the controller 6 transfers the notification to the NIC 7 via the network 8. Then in step 1613, the NIC 7 stores the notification in the completion queue 51.

In step 1614, the OS 11 fetches the read completion notification from the completion queue 51 and reads the read data from the read buffer memory 55. Instead of reading the read data from the read buffer 55, the OS 11 may refer to a pointer indicating the read data in the read buffer 55.

[Invalidation Operation]

Figure 17:
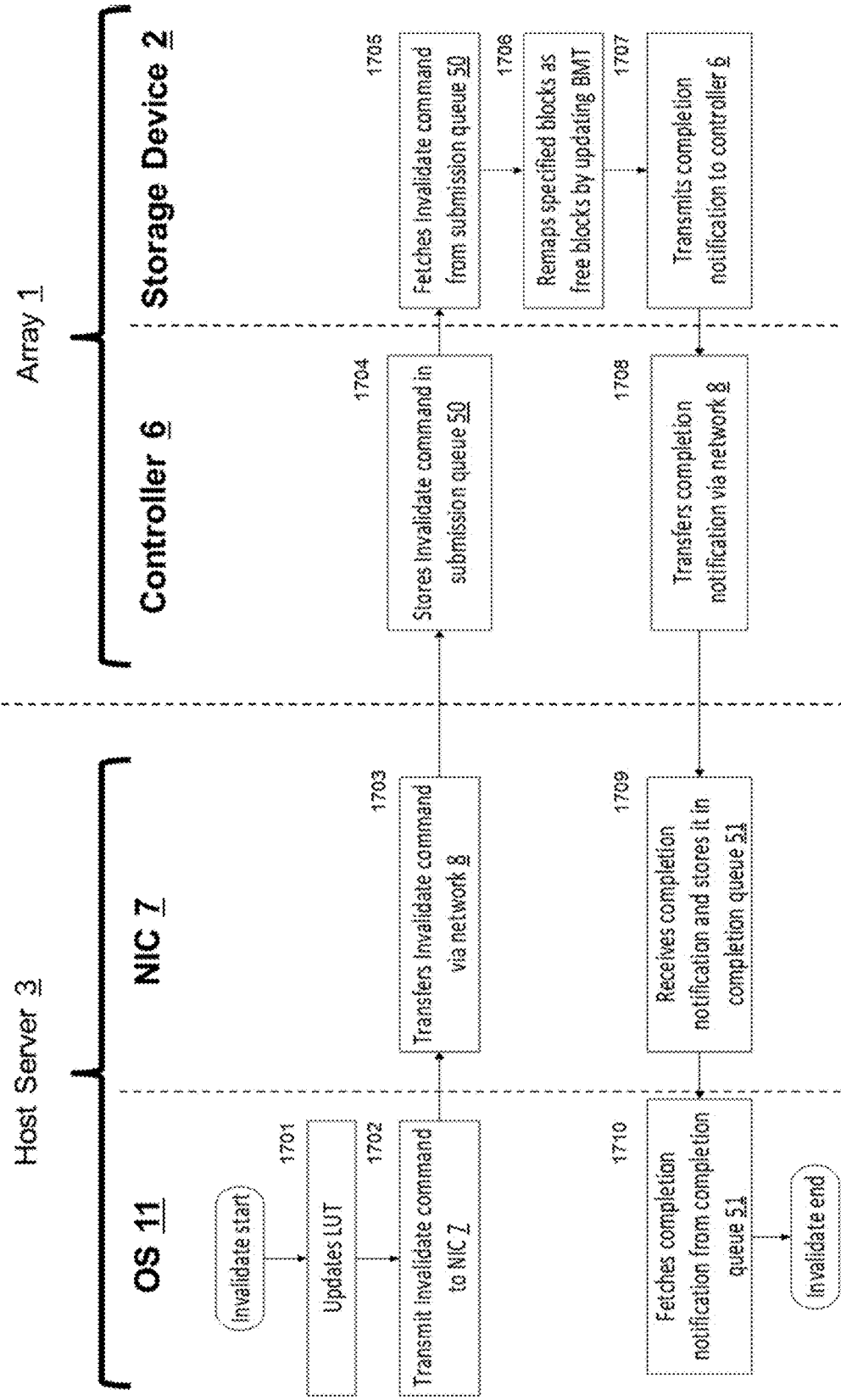
FIG. 17 is a flow chart showing an example of an invalidation operation performed by the OS and the array (storage device).

FIG. 17 is a flow chart showing an example of an invalidation operation performed by the OS 11 and the storage device 2. In the invalidation operation, the OS 11 accesses the storage device 2 via the network 8 and the interface 10.

In step 1701, the OS 11 updates the LUT 19 to invalidate mappings to a block to be invalidated.

In step 1702, the OS 11 transmits an invalidate command to the NIC 7 of the corresponding host serve 3. Then, in step 1703, the NIC 7 transfers the invalidate command to the controller 6 via the network 8. Then, in step 1704, the controller 6 stores the invalidate command in the submission queue 50. In step 1702, the OS 11 includes address entries which includes a pair of the chip address (physical chip address) 57 and the block address (physical block address) 58 to be invalidated in the invalidate command.

In step 1705, the controller 14 fetches the invalidate command from the submission queue 50 via the interface 10.

In step 1706, the controller 14 remaps a block to be invalidated as the free blocks 44 by updating the BMT 46.

In step 1707, the controller 14 transmits an invalidate completion notification to the controller 6 via the interface 10. Then, in step 1708, the controller 6 transfers the notification to the NIC 7 via the network 8. Then, in step 1709, the NIC 7 of the host server 3 stores the invalidate completion notification in the completion queue 51.

In step 1710, the OS 11 fetches the invalidate completion notification from the completion queue 51.

[Copy Operation (Copy within Array 1)]

Figure 18:
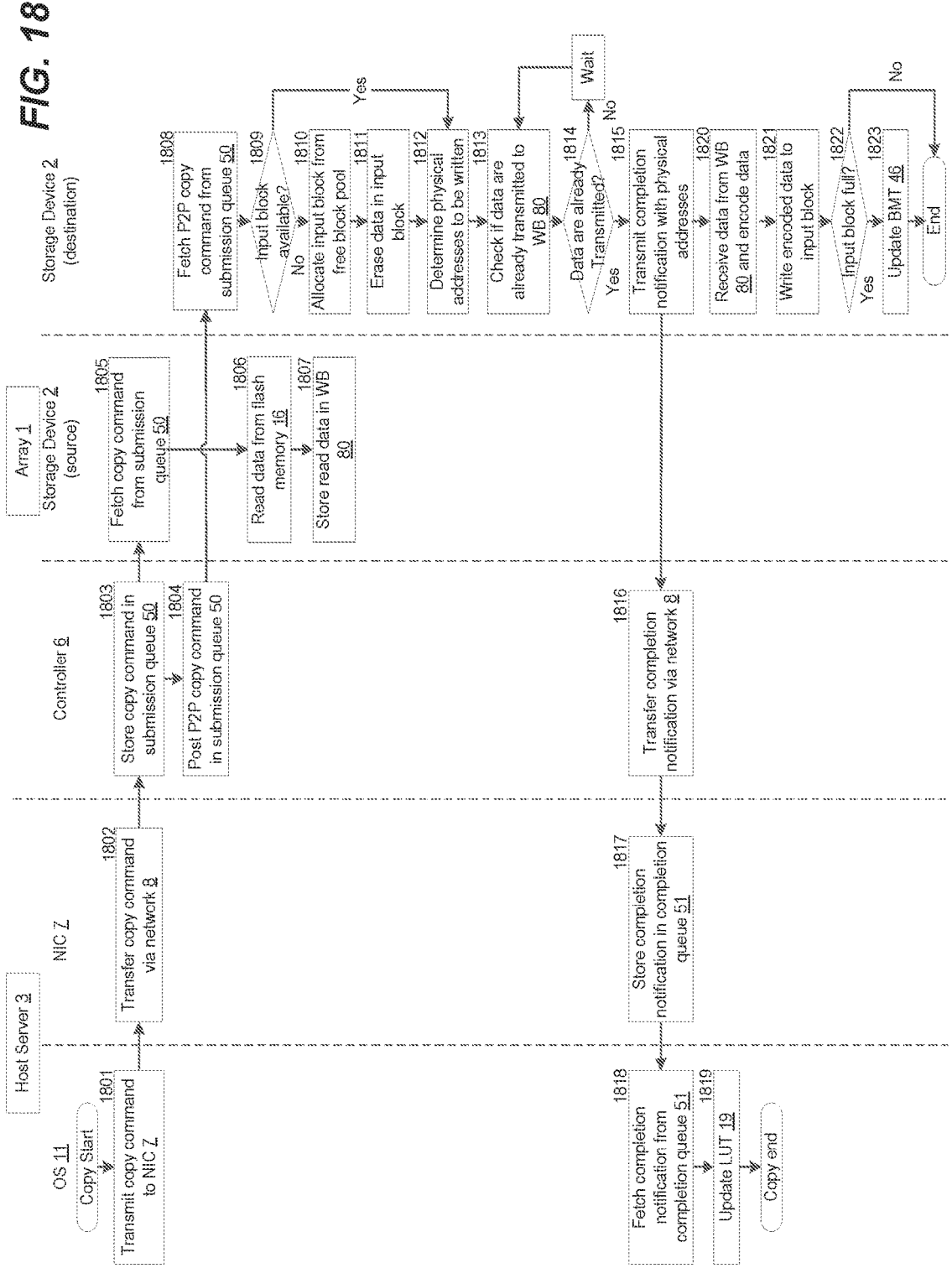
FIG. 18 is a flow chart showing an example of a copy operation performed by the OS 11 and the array (storage device).

FIG. 18 is a flow chart showing an example of a copy operation performed by the OS 11 and one of the arrays 1 of the present embodiment. Because copied data are not transmitted through the network 8, workload of the network 8 can be reduced.

In step 1801, the OS 11 of the host server 3 transmits a copy command to the NIC 7.

In step 1802, the NIC 7 receives the copy command, and transfers the copy command to the controller 6 of the array 1, through the network 8.

In step 1803, the controller 6 receives the copy command and stores the copy command in the submission queue 50. Then, in step 1804, the controller 6 posts a P2P copy command in the submission queue 50.

In step 1805, the controller 14 of the storage device 2 from which data are to be copied (source storage device), fetches the copy command from the submission queue 50. Then, in step 1806, the controller 14 of the source storage device 2 reads the corresponding data from the flash memory chip 17 thereof. Then, in step 1807, the controller 14 of the source storage device 2 stores the read data in the write buffer 80 in the array 1.

In step 1808, the controller 14 of the storage device 2 to which the copied data are to be written (destination storage device) fetches the P2P copy command from the submission queue 50. Then in step 1809, the controller 14 of the destination storage device 2 determines whether or not an input block 42 thereof is available for writing the copied data.

If the input block 42 is determined to be not available (No in step 1809), then in step 1810, the controller 14 of the destination storage device 2 assigns (remaps) a new input block 42 from the free block pool 440 by updating the BMT 46. Then, in step 1811, the controller 14 of the destination storage device 2 erases data in the new input block 42.

In step 1812, the controller 14 of the destination storage device 2 determines physical addresses (chip address, block address, and page address) of a memory region in which the copied data are to be written. In steps 1813 and 1814, the controller 14 of the destination storage device 2 waits until all copied data are transmitted from the source storage device 2 to the WB 80.

After step 1814, steps 1815-1823 are carried out in a similar manner to steps 1216-1224 carried out in the write operation.

[Extended Copy Operation (Copy Between Arrays 1)]

Figure 19:
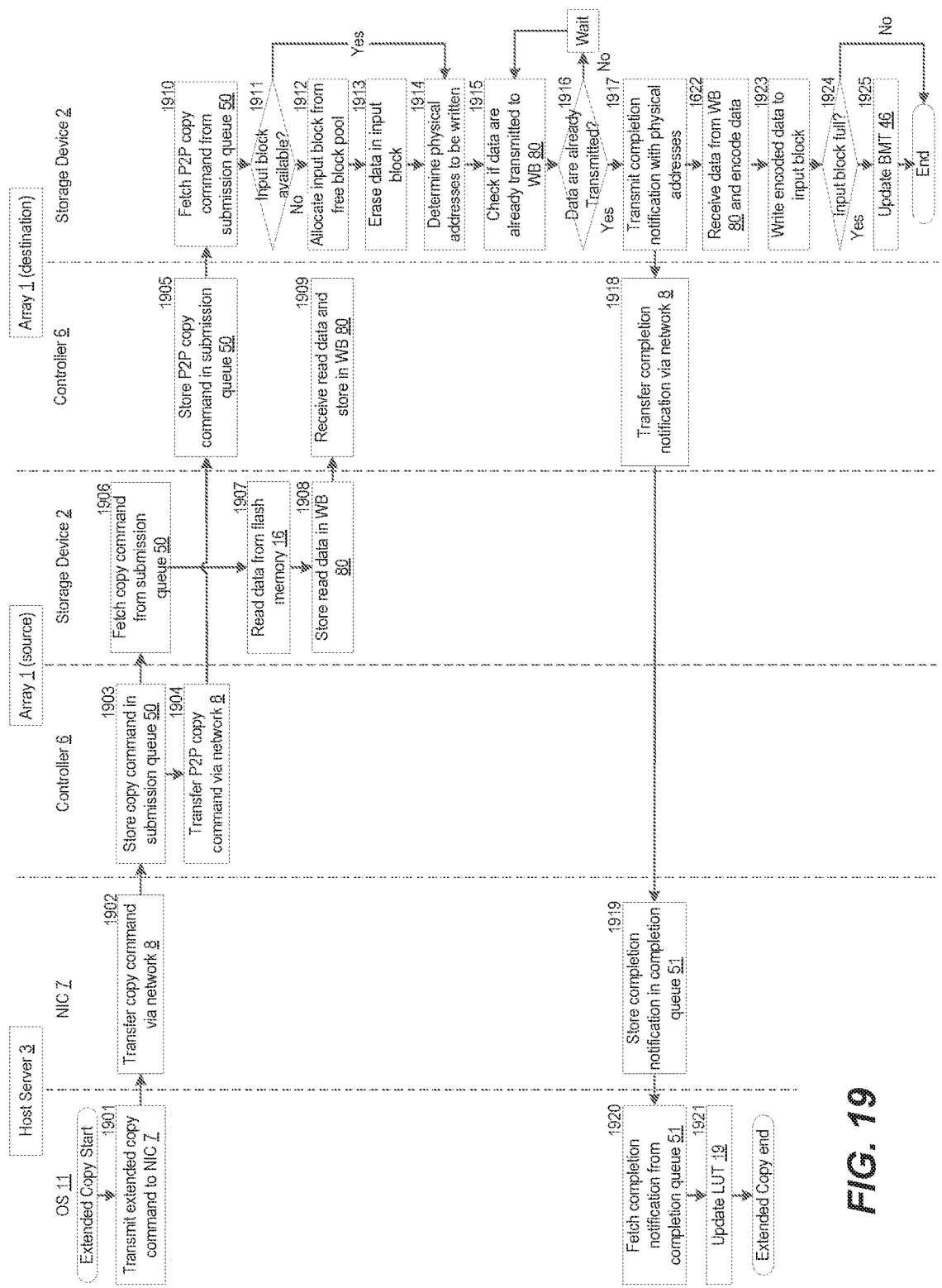
FIG. 19 is a flow chart showing an example of an extended copy operation performed by the OS and two arrays.

FIG. 19 is a flow chart showing an example of an extended copy operation performed by the OS 11 and two of the arrays 1 of the present embodiment.

In step 1901, the OS 11 of the host server 3 transmits a copy command to the NIC 7.

In step 1902, the NIC 7 receives the copy command, and transfers the copy command to the controller 6 of the array 1 from which data are to be copied (source array), through the network 8.

In step 1903, the controller 6 of the source array 1 receives the copy command and stores the copy command in the submission queue 50. Then, in step 1904, the controller 6 of the source array 1 transmits a P2P copy command to the controller 6 of the array 1 to which the copied data are to be written (destination array).

In step 1905, the controller 6 of the destination array 1 stores the P2P copy command in the submission queue thereof.

In step 1906, the controller 14 of the storage device 2 in the source array 1 fetches the copy command from the submission queue 50 thereof. Then, in step 1907, the controller 14 reads the corresponding data from the flash memory chip 17 thereof. Then, in step 1908, the controller 14 transmits the read data to the destination array 1.

In step 1909, the controller 6 of the destination array 1 receives the read data and stores the read data in the WB 80 thereof.

After step 1909, steps 1910-1925 are carried out in a similar manner to steps 1808-1823.

[Garbage Collection]

Figure 20:
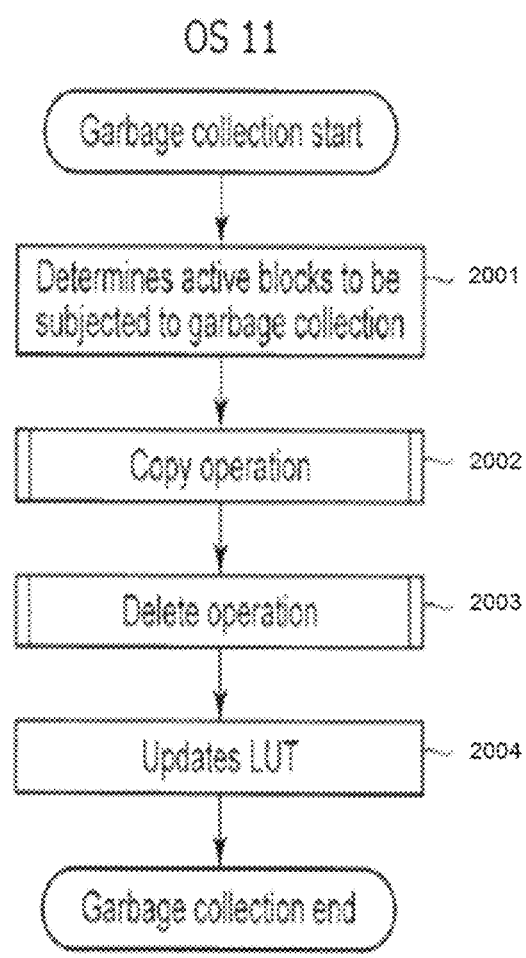
FIG. 20 is a flow chart showing an example of a garbage collection operation.

FIG. 20 is a flow chart showing an example of a garbage collection operation performed by a cooperative process between the OS 11 and one or more storage devices 2 of the present embodiment.

In step 2001, the OS 11 determines the active block 43 to be subjected to the garbage collection operation by referring to the LUT 19. In the LUT 19, physical addresses mapped from the File ID or Object ID correspond to addresses in which valid data are stored. In the LUT 19, physical addresses that are not mapped from the File ID or Object ID correspond to addresses in which invalid data are stored or no data are stored. The OS 11, by referring to the LUT 19, estimates amount of invalid data in each of the active blocks 43 (=size of physical block−size of valid data). The OS 11 selects an active block 43 storing the largest amount of invalid data (or an active block 43 having the largest ratio of invalid data to valid data) as a target block to be subjected to the garbage collection operation.

In step 2002, the OS 11 and the controller 14, through the copy operation shown in FIG. 18 or the extended copy operation shown in FIG. 19, copy all data stored the target block.

In step 2003, the OS 11 and the controller 14, though the invalidation operation shown in FIG. 18, invalidate the block in which data are copied in step 2102.

In step 2004, the OS 11 updates the LUT 19 to map a file ID or an object ID to the written physical address.

In the present embodiment described above, the storage device 2 does not have a Flash Translation Layer (FTL), and the controller 14 has a limited function. Compared to a storage device that has the FTL, a circuit region of the controller 14 that is used for the FTL can be saved, and energy consumption and manufacturing cost of the controller 14 can be reduced. Further, as the circuit region of the controller 14 can be reduced, memory capacity density thereof can be increased.

Further, as management data located from the flash memory 16 by the controller 14 at the time of booting the storage device 2 are at most the BMT 46, the boot time of the storage device 2 can be shortened.

Also, as no address conversion in the storage device 2 is needed when the application software 13 reads data from the storage device 2, the data can be read more quickly.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage apparatus comprising:
a central controller connectable to an external network;
a memory; and
a plurality of storage devices each connected to the central controller and including a local controller and a nonvolatile memory, wherein
the central controller is configured to temporarily store a write command and write data associated with the write command into the memory in response to receiving the write command and the write data through the external network, and then transmit the write command and the write data to one of the storage devices,
the local controller of said one of the storage devices is configured to determine a physical location of the nonvolatile memory thereof into which the write data are written, return the physical location to the central controller, and write the write data into the physical location,
the central controller is further configured to output the returned physical location through the external network,
the central controller is further configured to temporarily store a read command and a second physical location associated with the read command into the memory in response to receiving the read command and the second physical location through the external network, and then transmit the read command and the second physical location to one of the storage devices in which the second physical location exists, and
the local controller of said one of the storage devices that has received the read command reads data from the second physical location.

2. The storage apparatus according to claim 1, wherein the local controller of said one of the storage devices returns the physical location before writing the write data in the physical location.

3. The storage apparatus according to claim 2, wherein the local controller of said one of the storage devices returns the physical location after the central controller completes to receive the write data through the external network.

4. The storage apparatus according to claim 1, wherein the central controller transmits the write command and then the write data to the local controller of said one of the storage devices, and
the local controller of said one of the storage devices determines the physical location after receiving the write command and before receiving the write data.

5. The storage apparatus according to claim 1, wherein each of the storage devices stores block mapping data indicating a data storing state of each physical block of the nonvolatile memory thereof, and
the local controller of said one of the storage devices determines the physical location by referring to the block mapping data therein.

6. The storage apparatus according to claim 1, wherein the central controller is further configured to temporarily store an invalidate command and a third physical location associated with the invalidate command in the memory, respectively in response to receiving the invalidate command and the third physical location through the external network, and then transmit the invalidate command and the third physical location to one of the storage devices in which the third physical location exists, and the local controller of said one of the storage devices that received the invalidate command is configured to invalidate data stored in the third physical location.

7. The storage apparatus according to claim 1, wherein the central controller is further configured to temporarily store a copy command and a fourth physical location associated with the copy command in the memory, respectively in response to receiving the copy command and the fourth physical location through the external network, and then transmit the copy command and the fourth physical location to one of the storage devices in which the fourth physical location exists, and the local controller of said one of the storage devices that received the copy command is configured to read data stored in the fourth physical location, the central controller transmitting the read data to a destination storage device in which the read data are copied to.

8. The storage apparatus according to claim 7, wherein the central controller is further configured to transmit a second copy command to the destination storage device, and the local controller of the destination storage device is configured to write the read data in a physical location of the nonvolatile memory thereof in accordance with the second copy command.

9. The storage apparatus according to claim 8, wherein the local controller of the destination storage device is further configured to determine the physical location in which the read data are written, and return the determined physical location to the central controller.

10. A storage system comprising:
a plurality of hosts; and
a plurality of storage arrays which are connected through a network, wherein
each of the storage arrays comprises a central controller, a memory, and one or more storage devices, each of which includes a local controller and a nonvolatile memory,
a central controller of one of the storage arrays is configured to temporarily store a write command and write data associated with the write command into the memory of the storage array in response to receiving from one of the hosts the write command and the write data, and then transmit the write command and the write data to one of the storage devices in the storage array,
the local controller of said one of the storage devices is configured to determine a physical location of the nonvolatile memory thereof into which the write data are written, return the physical location to the central controller, and write the write data into the physical location,
the central controller is further configured to return the physical location to said one of the hosts through the network, the central controller of said one of the storage arrays is further configured to temporarily store a read command and a second physical location associated with the read command into the memory of the storage array in response to receiving the read command and the second physical location from one of the hosts, and then transmit the read command and the second physical location to one of the storage devices in which the second physical location exists, and the local controller of said one of the storage devices that has received the read command reads data from the second physical location.

11. The storage system according to claim 10, wherein said one of the hosts is configured to store correspondence between identification or logical address of the write data and the physical location after the physical location is returned.

12. The storage system according to claim 10, wherein the storage system includes a plurality of storage modules that are connected through a network line, and each of the storage modules includes at least one of the hosts and at least one of the storage arrays.

13. The storage system according to claim 10, wherein the local controller of said one of the storage devices returns the physical location before writing the write data in the physical location.

14. The storage system according to claim 13, wherein the local controller of said one of the storage devices returns the physical location after the central controller completes to receive the write data from the host.

15. The storage system according to claim 10, wherein the central controller of said one of the storage arrays is further configured to temporarily store an invalidate command and a third physical location associated with the invalidate command in the memory of the storage array, respectively in response to receiving from one of the hosts the invalidate command and the third physical location, and then transmit the invalidate command and the third physical location to one of the storage devices in which the third physical location exists, and the local controller of said one of the storage devices that received the invalidate command is configured to invalidate data stored in the third physical location.

16. The storage system according to claim 10, wherein the central controller of said one of the storage arrays is further configured to temporarily store a copy command and a fourth physical location associated with the copy command in the memory of the storage array, respectively in response to receiving from one of the hosts the copy command and the fourth physical location, and then transmit the copy command and the fourth physical location to one of the storage devices in which the fourth physical location exists, and the local controller of said one of the storage devices that received the copy command is configured to read data stored in the fourth physical location, the central controller transmitting the read data to a destination in which the read data are copied to.

17. The storage system according to claim 16, wherein the destination is another one of the storage devices in said one of the storage arrays.

18. The storage system according to claim 16, wherein the destination is a storage device in another storage array.

* * * * *